US011662092B2

(12) United States Patent
O'Connor et al.

(10) Patent No.: US 11,662,092 B2
(45) Date of Patent: May 30, 2023

(54) BIOCHAR APPARATUS AND PROCESS

(71) Applicant: Air Burners, Inc., Palm City, FL (US)

(72) Inventors: Brian M. O'Connor, Palm City, FL (US); Thomas Foley, St. Augustine, FL (US); Matthew W. Dennis, Port St. Lucie, FL (US); James W. Hilliard, Palm City, FL (US)

(73) Assignee: AIR BURNERS, INC., Palm City, FL (US)

( * ) Notice: Subject to any disclaimer, the term of this patent is extended or adjusted under 35 U.S.C. 154(b) by 307 days.

(21) Appl. No.: 17/029,742

(22) Filed: Sep. 23, 2020

(65) Prior Publication Data

US 2022/0090783 A1  Mar. 24, 2022

(51) Int. Cl.
| F23G 5/44 | (2006.01) |
| F23G 5/00 | (2006.01) |
| F23G 7/10 | (2006.01) |
| F23G 5/40 | (2006.01) |

(52) U.S. Cl.
CPC .............. *F23G 5/444* (2013.01); *F23G 5/004* (2013.01); *F23G 7/105* (2013.01); *F23G 5/40* (2013.01); *F23G 2205/122* (2013.01)

(58) Field of Classification Search
CPC .......... F23G 5/444; F23G 5/004; F23G 7/105; F23G 2205/122; F23G 5/40
See application file for complete search history.

(56) References Cited

U.S. PATENT DOCUMENTS

| 2,179,080 | A | * | 11/1939 | Alther | C10B 55/00 |
| | | | | | 208/50 |
| 3,504,645 | A | * | 4/1970 | Davenport | F23J 1/02 |
| | | | | | 110/165 R |
| 3,773,001 | A | * | 11/1973 | Bottalico | F23G 5/40 |
| | | | | | 110/193 |
| 4,452,611 | A | * | 6/1984 | Richey | F23G 7/10 |
| | | | | | 110/255 |
| 4,840,132 | A | * | 6/1989 | Jose | F23G 5/46 |
| | | | | | 432/116 |
| 4,936,231 | A | * | 6/1990 | Johnson | F23G 5/002 |
| | | | | | 110/165 R |
| 5,103,744 | A | * | 4/1992 | Tunstromer | F23H 15/00 |
| | | | | | 110/165 R |
| 5,415,113 | A | | 5/1995 | Wheeler et al. | |
| 6,536,360 | B2 | | 3/2003 | O'Connor | |
| 7,004,088 | B2 | | 2/2006 | Ford | |
| 7,063,027 | B2 | | 6/2006 | O'Connor | |
| 7,503,268 | B2 | | 3/2009 | O'Connor | |
| 7,895,596 | B2 | | 3/2011 | O'Connor | |
| 10,501,689 | B2 | | 12/2019 | Archuleta, Jr. et al. | |

* cited by examiner

*Primary Examiner* — David J Laux
(74) *Attorney, Agent, or Firm* — Hodgson Russ LLP (57) ABSTRACT

A biochar apparatus and a related biochar module may have a horizontal table-shaking mechanism and a tapered channel for causing biochar pieces generated in a firebox to fall through openings in the table to a conveyor system below. The table may be configured with replaceable grate panels. A quenching reservoir pan for holding quenching liquid receives a drainage basket at a discharge end of the conveyor system for quenching hot pieces of biochar and allowing easy retrieval of the quenched pieces.

16 Claims, 13 Drawing Sheets

BIOCHAR APPARATUS AND PROCESS

FIELD OF THE DISCLOSURE

This disclosure relates to an apparatus and process for converting biomass to biochar. The apparatus and process may be transported to and used at locations where biomass is produced, such as forestry and development sites.

BACKGROUND OF THE DISCLOSURE

Biomass waste generated at land clearing and lumbering sites is difficult and expensive to transport to other locations for processing, and unprocessed biomass takes up considerable space in landfills. Therefore, it is common to burn biomass at or near the site in open pits or in transportable fireboxes. To minimize the release of ash and particulates into the atmosphere during burning of the biomass, "air curtain" fireboxes were developed in which a flow of high-velocity air is directed over a top region of the firebox to contain combustion products in the firebox and promote high-temperature burning of the biomass. Examples of air curtain fireboxes are describe in U.S. Pat. Nos. 5,415,113; 6,536,360; 7,004,088; 7,063,027; 7,503,268; and 7,895,596.

Biochar, an end product of burning biomass, is useful in agriculture to enhance soil fertility and water retention capacity. Biochar is also useful in animal feed or as a bio-based substitute for active carbon. U.S. Pat. No. 10,501,689 describes a mobile charcoal/biochar production and pelletizer system which automatically produces a pelletized biochar from biomass burned in a firebox of the system. In addition to the firebox, an embodiment of the system includes a grate arranged as a floor of the firebox to support biomass, a conveyor system under the grate, and a vertical shaker mechanism for moving the grate up and down to cause pieces of charcoal and biochar to fall through openings in the grate and onto a conveyor belt of the conveyor system. The conveyor system conveys the pieces of charcoal and biochar to an extruding compartment filled with water to quench and cool the pieces. An extruder in the extruding compartment forces the charcoal and biochar pieces out of the extruding compartment through extrusion ports, and a cutter slices the extruded material as it exits the extruding compartment to form pellets. The described system makes progress toward the goal of providing biochar in a convenient form for later use. However, use of a vertical shaker mechanism requires the entire grate to be vertically actuated by multiple actuators at different support locations on a periphery of the grate. Also, synchronized cooperation between the extruder and the conveyor system adds complexity to automated controls for these features, and there is a risk of that discharge of hot biochar from the conveyor system will become blocked if the extruder malfunctions or functions too slowly. More generally, the disclosure of U.S. Pat. No. 10,501,689 does not provide a solution whereby an existing firebox may be retrofitted to produce transportable biochar pieces for agricultural and other uses.

SUMMARY OF THE DISCLOSURE

The present disclosure provides various apparatuses and processes for producing biochar from raw biomass. The biochar may be used for agricultural purposes to enhance soil fertility and water retention capacity. The biochar may also be used in animal feed or as a bio-based substitute for active carbon.

In one embodiment, a biochar apparatus generally comprises a firebox for containing biomass to be burned to produce biochar, a table arranged to support biomass contained in the firebox, a conveyor system under the table, and a shaker mechanism connected to the table. The shaker mechanism is operable to cyclically move the table in a horizontal plane relative to the firebox, and the table includes a plurality of openings through which pieces of biochar pass to the conveyor system. In an aspect of the disclosure, the table may include a table frame and a plurality of grate panels each removably supported by the table frame, whereby damaged or worn grate panels may be replaced and/or a size of the table openings may be selectively modified. The conveyor system is operable to convey the pieces of biochar and discharge the pieces of biochar from the conveyor system for use in other applications. The apparatus may further comprising a channel between the table and the conveyor system, wherein the channel includes a tapered inner wall arranged to cover at least one of a drive pulley and an idler pulley of the conveyor system and guide the pieces of biochar toward a conveyor belt of the conveyor system.

In another embodiment, a biochar apparatus generally comprises a firebox for containing biomass to be burned to produce biochar, a table arranged to support biomass contained in the firebox, a conveyor system under the table having a discharge end, a quenching reservoir pan adjacent the discharge end of the conveyor system for containing a quenching liquid, and a drainage basket removably received by the quenching reservoir pan. The table includes a plurality of openings through which pieces of biochar pass to the conveyor system, and the conveyor system is operable to convey the pieces of biochar and discharge the pieces of biochar from the conveyor system to the drainage basket and the quenching reservoir pan.

Yet another embodiment provides a module for connection to a firebox for containing biomass to be burned to produce biochar. In a basic version, the module generally comprises a module frame configured to support the firebox when the module frame is placed under the firebox, and a conveyor system supported by the module frame. The module frame defines a discharge opening, and the conveyor system is arranged to receive biochar from the firebox by gravity and is operable to convey the received biochar toward the discharge opening of the module frame and to discharge the received biochar from the conveyor system at the discharge opening of the module frame. The basic module may include a channel fixed to the module frame, wherein the channel extends upwardly from the module frame and into a lower region of the firebox when the firebox is supported by the module frame, and the channel may have a tapered inner wall. In a more advanced version, the module may further comprise a table over the conveyor system arranged to support biomass contained in the firebox, wherein the table includes a plurality of openings through which pieces of biochar pass to the conveyor system, and a shaker mechanism connected to the table, wherein the shaker mechanism is operable to cyclically move the table in a horizontal plane relative to the module frame and the firebox.

A process for producing pieces of biochar generally comprises burning biomass in a firebox to produce biochar, wherein the biomass is supported in the firebox by a table having a plurality of openings, cyclically moving the table in a horizontal plane relative to the firebox to cause pieces of the biochar to fall through the plurality of openings, automatically conveying the pieces of biochar to a drainage basket removably received by a quenching reservoir pan containing a quenching liquid, and removing the drainage basket containing the pieces of biochar from the quenching reservoir pan.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

A transportable biochar apparatus 10 according to an embodiment of the present disclosure is now described with reference to FIGS. 1-6. Biochar apparatus 10 comprises a firebox 12 for containing biomass to be burned to produce biochar. Apparatus 10 also comprises a table 14 arranged to support biomass contained in firebox 12, and a conveyor system 16 located under table 14. Apparatus 10 may further comprise a shaker mechanism 18 connected to table 14.

Firebox 12 may be a rectangular firebox having a pair of longitudinal side walls 20 connected by a transverse front wall 21 and a transverse rear wall 22 cooperating to define a combustion chamber 23. Each wall 20, 21, and 22 is lined on the inside with a layer of thermo-ceramic refractory material in the form of refractory panels 24 to provide thermal insulation while biomass is being burned within firebox 12. Refractory panels 24 may be held in place by steel framing.

Firebox 12 may be equipped with an air curtain system 26. Air curtain system 26 may include a manifold assembly 28 mounted to extend along the top edge of one of the side walls 20, and a fan 30 operable to supply high velocity air flow to manifold 28 by way of a duct 29. Fan 30 may be a centrifugal fan or other type of fan or blower. Fan 30 may be driven by an internal combustion engine 32, for example a diesel engine, that is connected to a fuel tank 34. Alternatively, fan 30 may be driven by an electric motor or a hydraulic motor. Manifold 28 may be generally tubular, and may include a plurality of air discharge nozzles 36 arranged along the length of manifold 28 for directing an effective sheet or curtain of high velocity air across and slightly downward into combustion chamber 23. By way of non-limiting example, the BURNBOSS® air curtain burner commercially available from Air Burners, Inc. of Palm City, Fla. includes a firebox and associated air curtain system suitable for practicing the present disclosure.

Table 14 is arranged at a bottom region of firebox 12 to support biomass contained in the firebox. Table 14 includes a plurality of openings 38 through which pieces of biochar may pass and fall onto conveyor system 16. Table 14 may include a table frame 40 and a plurality of grate panels 42 each removably supported by table frame 40, wherein the grate panels 42 include the openings 38. Table frame 40 may rest on a plurality of table support members 44 that are fixed relative to the firebox 12. For example, table support members 44 may be arranged to extend transversely across firebox 12 from one side wall 20 to the other side wall 20. Table frame 40 may be configured in the manner of a grid having a peripheral frame portion 46 spanned by a plurality of longitudinal beams 48 and transverse beams 50. As may be understood, table frame 40 defines a plurality of recessed support areas for removably receiving and supporting the individual grate panels 42. In an example embodiment, grate panels 42 may be rectangular panels measuring eighteen inches by twenty-eight inches, however both the size and shape of each panel are subject to design choice to suit dimensional requirements. The components of table 14, including table frame 40 and grate panels 42, may be fabricated from steel, stainless steel, cast iron, and/or cast thermos-ceramic. As may be understood, grate panels 42 are easily replaceable, which provides at least two advantages. First, grate panels 42 having openings 38 of a first size may be swapped out for grate panels 42 having openings of a second size different from the first size. As a result, the size of biochar pieces which fall through table openings 38 onto conveyor system 16 may be controlled, and may be chosen based on the type of biomass to be burned at a given site. Second, individual grate panels 42 which become damaged or worn during loading and/or burning of biomass may be replaced with new grate panels 42, thereby avoiding the need to replace the entire table if damage occurs at a confined region of the table.

Conveyor system 16 is operable to convey the pieces of biochar which fall through openings 38 in table 14 and discharge the pieces of biochar from the conveyor system 16 at a discharge end 52 of the conveyor system. Conveyor system 16 may comprise a conveyor drive motor 54, a drive pulley 56 driven to rotate by conveyor drive motor 54, an idler pulley 58 spaced from drive pulley 56, and a conveyor belt 60 engaged by drive pulley 56 and idler pulley 58. In the illustrated example embodiment, drive pulley 56 may be arranged at discharge end 52 of conveyor system 16, and may be connected to drive motor 54 by way of a gearbox 62. Pulleys 56 and 58 may extend transversely between opposite support beams 64 of conveyor system 16, wherein opposite ends of each pulley are rotatably supported by bearings in support beams 64. As may be understood, the rotational axis of drive pulley 56 and the rotational axis of idler pulley extend horizontally parallel to one another and are spaced apart in a longitudinal direction from the front of firebox 12 to the rear of firebox 12. Conveyor belt 60 may be a continuous conveyor belt having chains on each side engaged by sprockets on pulleys 56 and 58, such that when drive pulley 56 is rotated by drive motor 54 the conveyor belt 60 continuously proceeds from a front end of conveyor system 16 associated with the front wall 21 of firebox 12 toward the discharge end 52 of conveyor system 16 associated with the rear wall 22 of firebox 12. The material used to form conveyor belt 60 between its side chains may be a compliant metal mesh material designed to withstand high temperatures.

The support beams 64 may be arranged to extend under the opposite side walls 20 of firebox 12 for supporting the firebox above conveyor system 16 when the conveyor system 16 and firebox 12 are situated on the ground at a biomass clearing site. A front crossbeam 65 may extend transversely to the longitudinal support beam 64 and provide further support under the front wall 21 of firebox 12. Conveyor system 16 may further include inner thermal walls 66 respectively arranged adjacent to the support beams 64. Inner thermal walls 66 may have a layer of thermo-ceramic refractory material formed by one or more refractory panels 68 to provide thermal insulation while biomass is being burned within firebox 12 and pieces of biochar are being conveyed by conveyor system 16. Refractory panels 68 may be held in place by steel framing of wall 66, which framing may be fixed to an associated support beam 64 by bolting and/or welding. Crossbeam 65 may also have a layer of thermo-ceramic refractory material along its inner side. Upper and lower belt guides 69 may be attached to each of the inner thermal walls 66 for guiding conveyor belt 60 along its longitudinal upper and lower extents.

Figure 6:
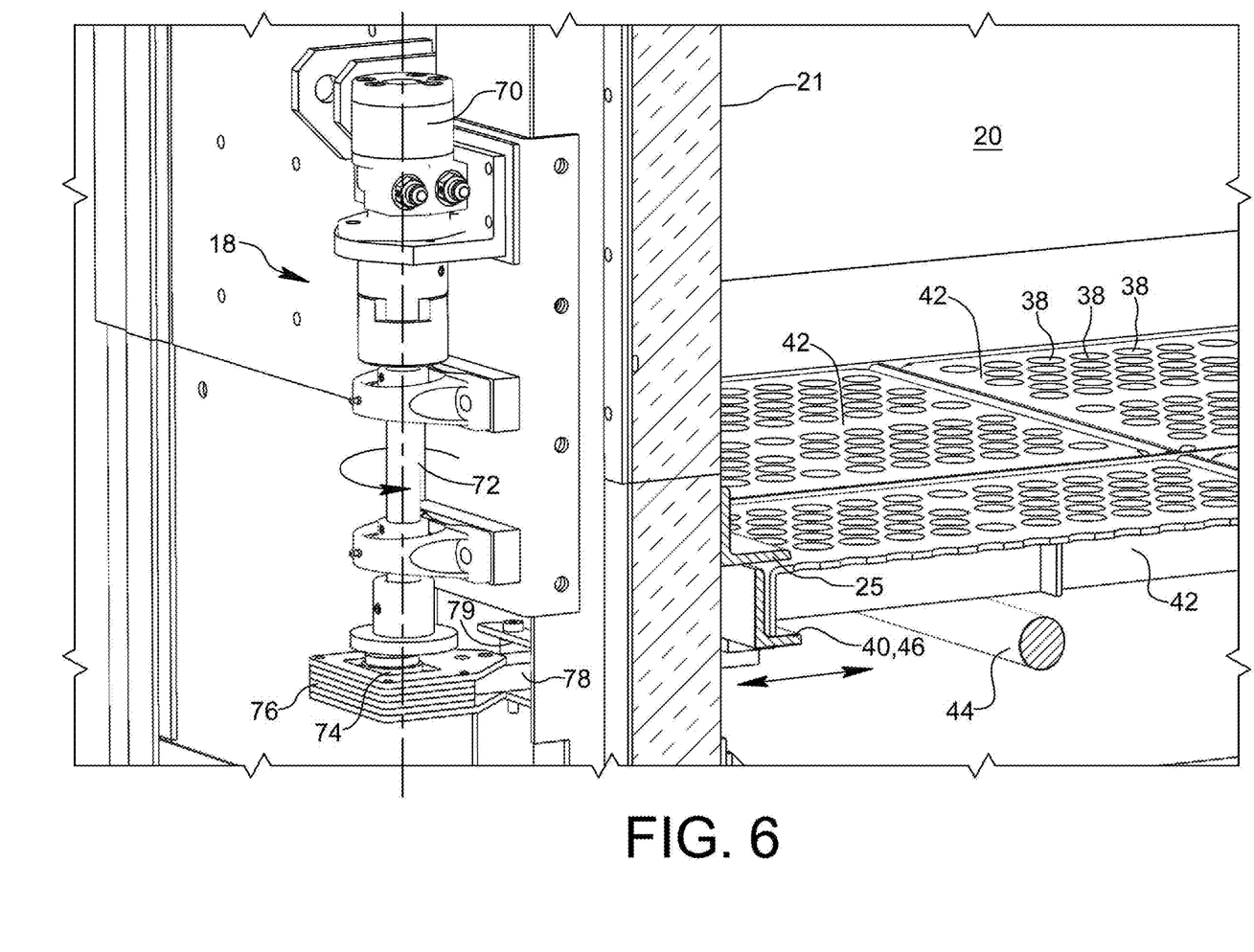
FIG. 6 is a sectioned perspective view showing a table shaker mechanism of the firebox and conveyor system assembly shown in FIG. 3.
Figure 7:
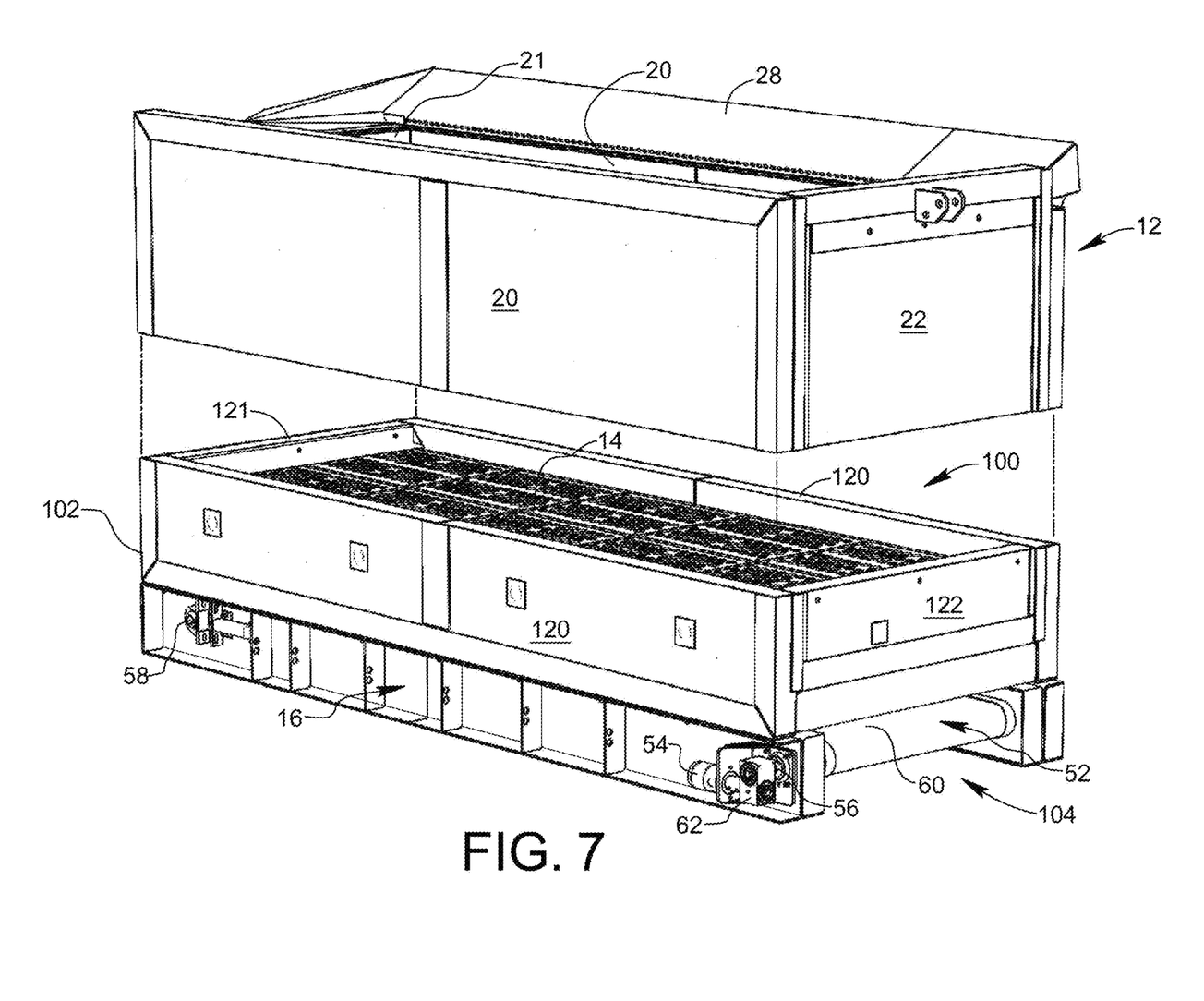
FIG. 7 is an exploded perspective view of a biochar module and firebox illustrating another embodiment of the present disclosure.

Shaker mechanism 18 may be provided to cyclically move table 14 in a horizontal plane relative to firebox 12 to cause biochar within combustion chamber 23 to break up into smaller pieces and fall through openings 38 of table 14 onto conveyor belt 60. Shaker mechanism 18 may include a shaker drive motor 70, a shaker drive shaft 72 rotated by shaker drive motor 70, a cam 74 coupled to shaker drive shaft 72 for rotation with the shaker drive shaft, a follower 76 engaged by cam 74, and a transmission member 78 arranged to transmit motion from follower 76 to the table frame 40. Cam 74 may be eccentrically arranged with respect to a rotational axis of shaker drive shaft 72, and may be received within a cam recess 77 in cam follower 76 such that rotation of shaker drive shaft 72 and cam 74 causes cam follower 76 to oscillate. As illustrated in FIG. 6, the oscillating motion of cam follower 76 may be in a horizontal plane, and the rotational axis of the shaker drive shaft 72 may be vertical. In an alternative arrangement described below in connection with a modular embodiment shown in FIGS. 7-10, shaker drive motor 70, shaker drive shaft 72, and cam 74 may be rotated by ninety degrees from the orientation shown in FIG. 6 such that the rotational axis of the shaker drive shaft 72 is horizontal yet remains orthogonal to the horizontal stroke axis of table frame 40.

Transmission member 78 may extend through a passage 79 in the front wall 21 of firebox 12, and may have one end connected to cam follower 76 and another end connected to table frame 40. Accordingly, when shaker drive motor 70 is operated, shaker mechanism 18 may transmit a reciprocating horizontal stroke to table frame 40 in a longitudinal direction of firebox 12. For example, the reciprocating horizontal stroke (i.e. the total travel distance rearward and forward in a complete cycle) may be in a range from one inch through two inches. A pair of steel retaining members 25 may be fixed to the interior surface of front wall 21 and rear wall 22 just above table frame 40 to limit motion of table 14 to a horizontal plane. By limiting the shaking motion of table 14 to a horizontal plane, grate panels 42 of table 14 may be held in place in table frame 40 without fasteners for efficient installation and replacement. Also, for horizontal shaking motion, it is unnecessary to have forces and mechanisms acting on table frame 40 in synchronous fashion at multiple locations, which is a drawback of providing vertical shaking motion.

As an alternative to the rotationally driven shaker mechanism 18 described above, a hydraulic linear actuator or an electromechanical linear actuator may be connected to table frame 40 to transmit a reciprocating horizontal stroke to table frame 40 in the longitudinal direction of firebox 12.

Biochar apparatus 10 may further comprise a channel 15 between table 14 and conveyor system 16. Channel 15 may include a tapered inner wall 17 arranged to cover at least one of the drive pulley 56 and the idler pulley 58 and guide pieces of biochar which fall through peripheral openings 38 of table 14 toward the conveyor belt. This feature protects the covered pulley 56 and/or 58 from small biochar pieces that may damage the pulley or interfere with its rotational operation. Tapered inner wall 17 may have a layer of thermo-ceramic refractory material formed by one or more refractory panels 19 to provide thermal insulation while biomass is being burned within firebox 12 and pieces of biochar are passing through table 14 to conveyor system 16. Refractory panels 19 may be held in place by steel framing of inner wall 17. Inner wall 17 of channel 15 is considered tapered in the sense that it slopes downward and inward from table 14 to funnel biochar pieces from the relatively larger area of table 14 to the relatively smaller area presented by conveyor belt 60.

Figure 1:
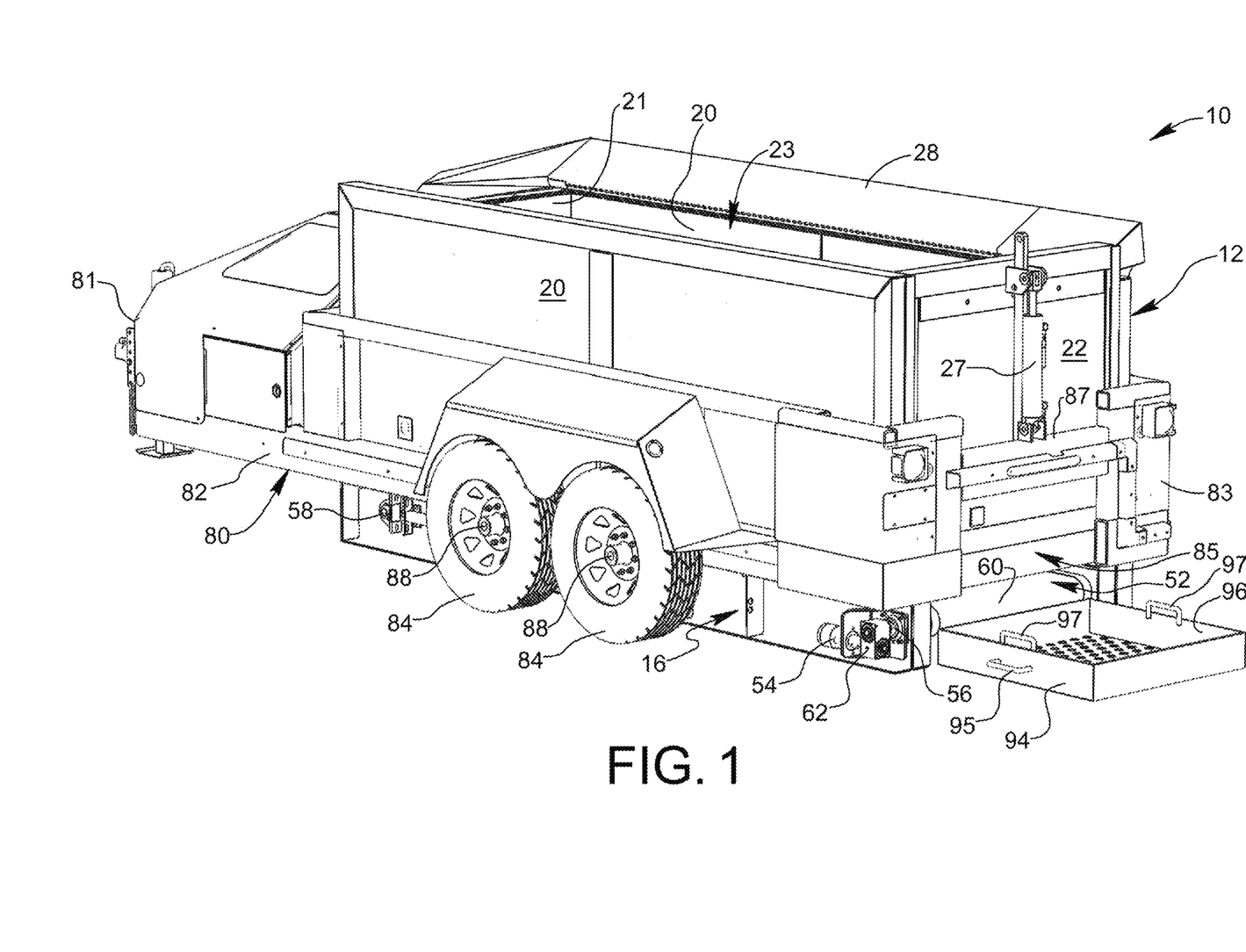
FIG. 1 is perspective view of a portable biochar apparatus formed in accordance with an embodiment of the present disclosure.
Figure 2:
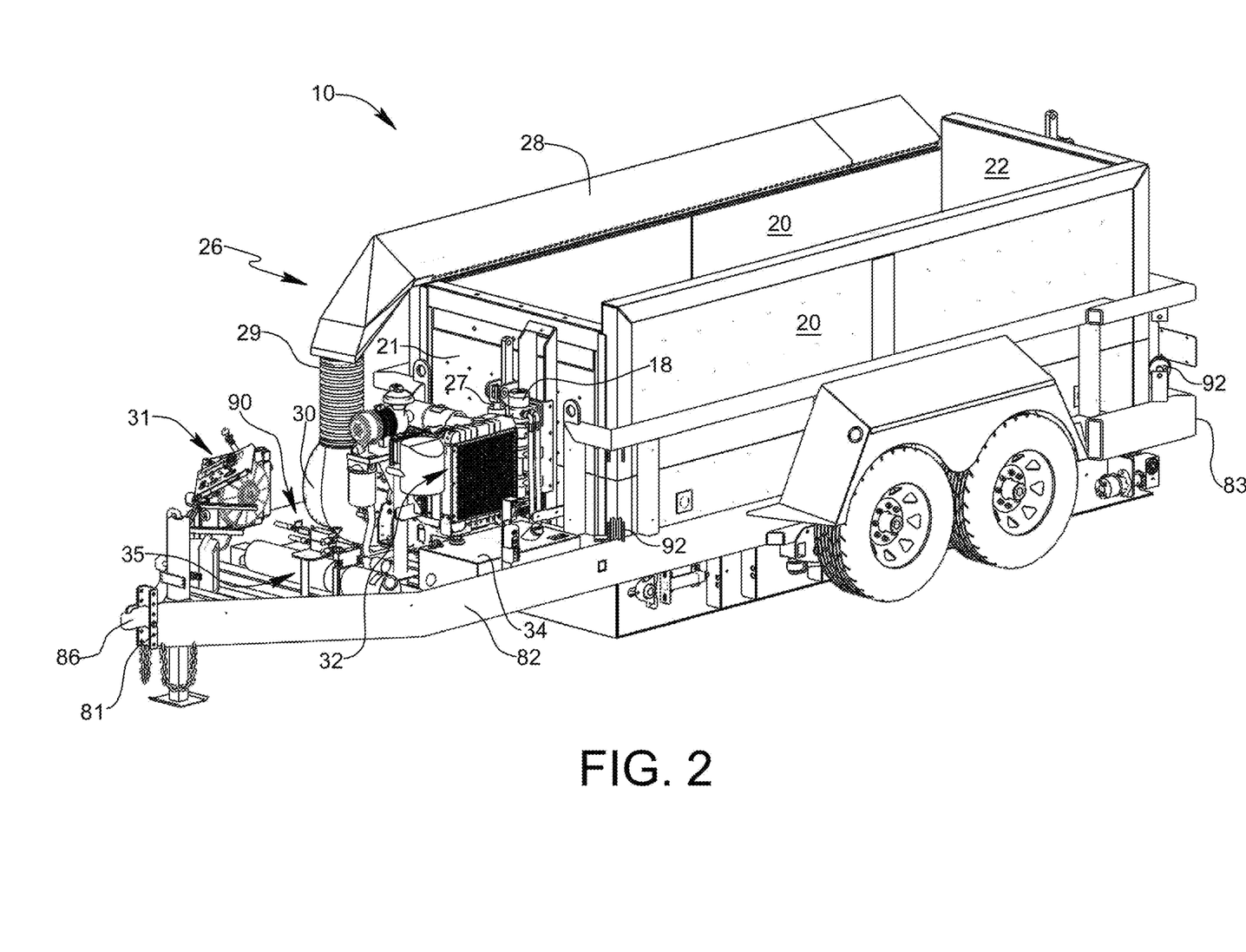
FIG. 2 is another perspective view of the portable biochar apparatus shown in FIG. 1, wherein cover panels of a chassis of the apparatus are omitted to reveal internal structure.
Figure 3:
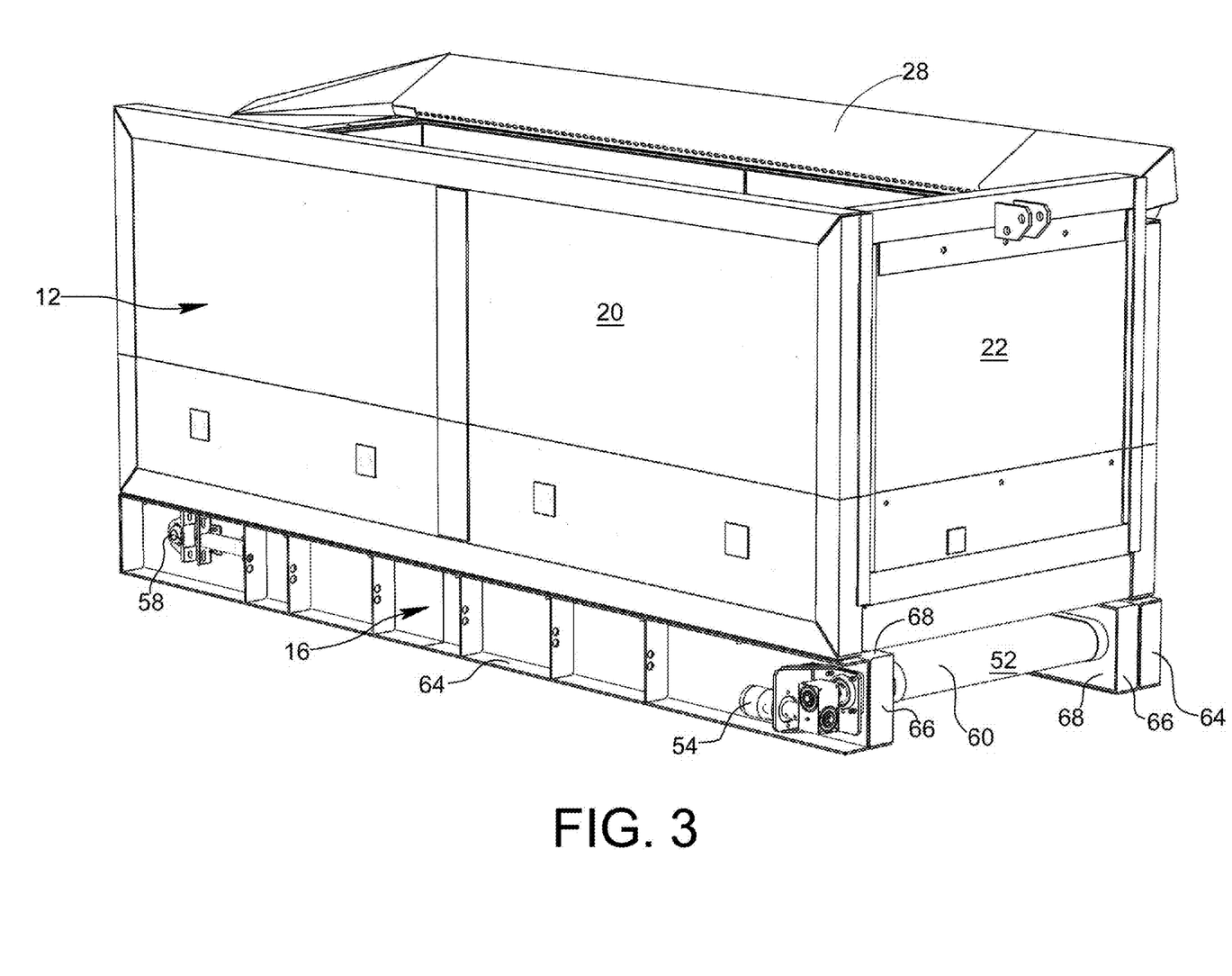
FIG. 3 is a perspective view of a firebox and conveyor system assembly of the portable biochar apparatus.
Figure 4:
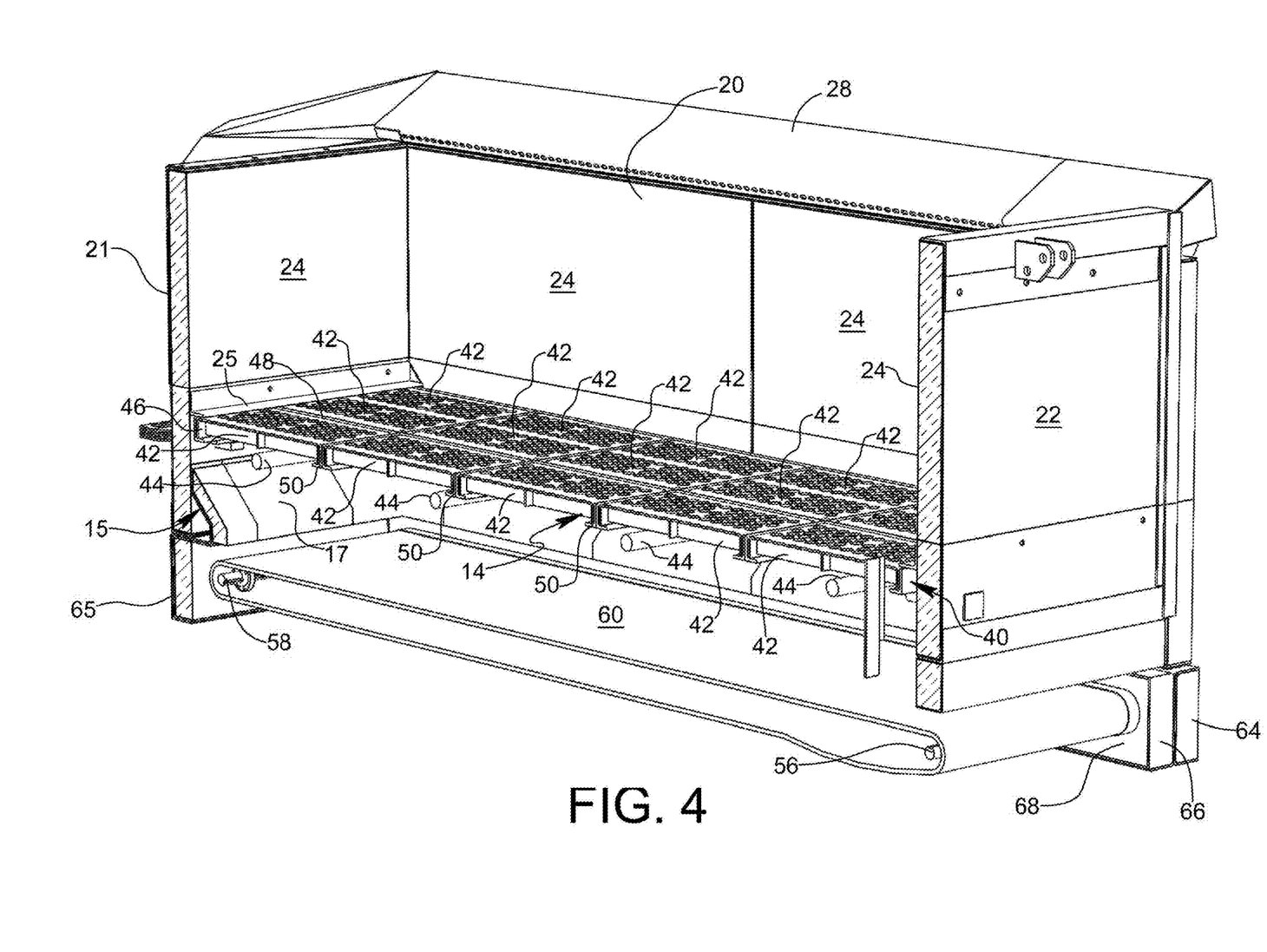
FIG. 4 is a sectioned perspective view of the firebox and conveyor system assembly shown in FIG. 3.
Figure 5:
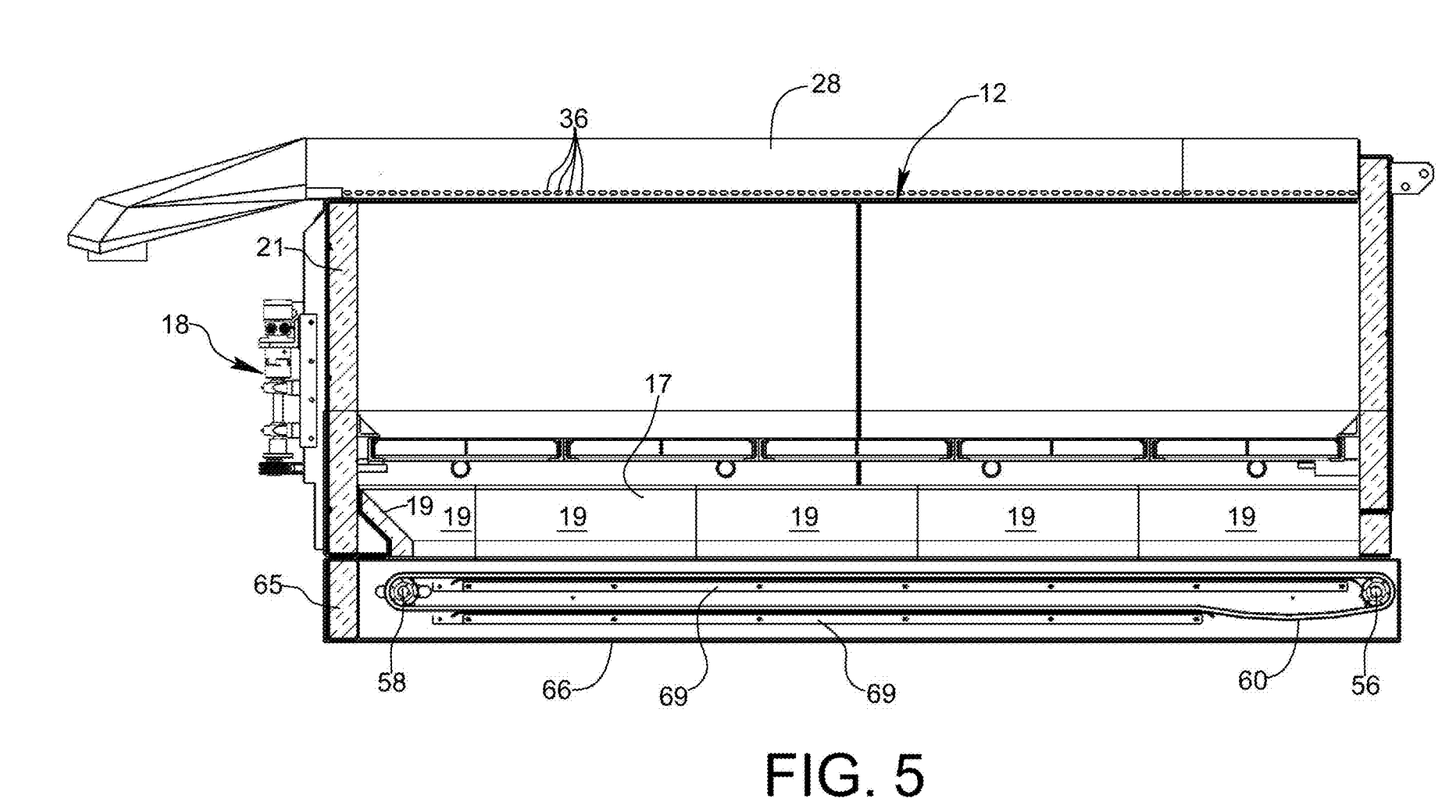
FIG. 5 is a cross-sectional view of the firebox and conveyor system assembly shown in FIG. 3.

Biochar apparatus 10 may comprise a chassis 80 designed to facilitate transport of the apparats to and from work sites where biomass is cleared and burned. Chassis 80 may include a front end 81 and a rear end 83, wherein firebox 12 is carried by chassis 80 and conveyor system 16 is operable to convey the pieces of biochar to rear end 84 of chassis 80 and discharge the pieces of biochar from the conveyor system at the rear end of the chassis. Rear end 83 of chassis 80 may include a transverse gap 85 for allowing the pieces of biochar to be discharged from conveyor system 16. Chassis 80 may be in the form of a trailer having a trailer frame 82, wheels 84, and a front hitch coupling 86 for connecting the trailer to a vehicle, such as a truck (not shown). Transverse gap 85 may be provided in trailer frame 82 by having a raised rear member 87 as shown in FIG. 1.

Instead of a wheeled trailer, chassis 80 may take the form of a truck, or a vehicle propelled by engine-driven continuous tracks (i.e., caterpillar tracks) for navigating difficult terrain.

In order to provide an open area in chassis 80 for accommodating firebox 12, wheels 84 may be mounted on respective independent torsion axles 88 fixed to outer side members of trailer frame 82. Independent torsion axles 88 may be formed by cutting a commercially available torsion axle and welding the cut-off portion to an associated side member of trailer frame 82. Chassis 80 may include an equipment deck 90 arranged and configured to support mechanical equipment and user interface controls for apparatus 10 such as fan 30, engine 32, fuel tank 34, a control console 31, and a hydraulic pump system 35. In the illustrated embodiment, equipment deck 90 is located on trailer frame 82 between front hitch coupling 86 and front wall 21 of firebox 12, however other arrangements are possible.

Firebox 12 may be adjustably mounted on chassis 80 for upward and downward movement relative to the chassis, whereby firebox 12 and other portions of apparatus 10 attached to firebox 12 may be selectively raised off the ground for transport and lowered onto the ground for use. In the illustrated embodiment, firebox 12 is mounted on the frame 82 of chassis 80 by a pair of hydraulically powered linear actuators 27, one at a centered location adjacent front wall 21 and the other at a centered location adjacent rear wall 22. Actuators 27 may be connected to hydraulic system 35. Chassis 80 may include a plurality of firebox guide rollers 92 positioned to engage respective corners of firebox 12 to reduce friction between firebox 12 and frame 82 as the firebox is moved up and down relative to the frame. For example, guide rollers 92 may be mounted on structural members of 82. Guide rollers 92 also serve to limit contact area between firebox 12 and frame 82 to minimize heat transfer between the firebox and frame, and help maintain alignment of the firebox with respect to the frame. While the illustrated embodiment employs hydraulically powered linear actuators 27 for raising and lower firebox 12, other means may be employed, such as a cable and winch system.

As illustrated in FIG. 1, biochar apparatus 10 may further comprises a quenching reservoir pan 94 adjacent the discharge end 52 of conveyor system 16, and a drainage basket 96 removably received by the quenching reservoir pan 94, wherein the pieces of biochar are discharged from conveyor system 16 to drainage basket 96 and quenching reservoir pan 98. Quenching reservoir pan 94 holds a supply of a quenching liquid, for example water, to quench the hot pieces of biochar discharged from conveyor system 16. Quenching reservoir pan 94 may have a pair of handles 95, and drainage basket 96 may have a pair of handles 97, to facilitate handling. As will be understood, drainage basket 96 comprises a porous mesh having drainage openings sized to retain the pieces of biochar but allow the quenching liquid to remain in reservoir pan 94. Thus, when drainage basket 96 is filled with biochar pieces, it may be manually removed from reservoir pan 94, emptied at a desired location, and returned into reservoir pan 94 such that the existing quenching liquid may be reused. As shown in the illustrated embodiment, quenching reservoir pan 94 may have a width corresponding to a width of conveyor belt 60, and drainage basket 96 may have a width dimensioned for close fit within the width of quenching reservoir pan 94. Quenching reservoir pan 94 may have a length slightly greater than a length of drainage basket 96 to receive the drainage basket in close fit, as shown in FIG. 1, or reservoir pan 94 may have a length substantially greater than the length of drainage basket 96 to hold more quenching liquid. The depth of quenching liquid in reservoir pan 94 may be set in accordance with the size of biochar pieces to be quenched, and each biochar piece may be quenched almost independently. As will be appreciated, quenching reservoir pan 94 and drainage basket 96 provide significant advantages over prior art quenching methods in which pellets are bathed in a deep water bath or are sprayed with a flow of quenching liquid. In the prior art methods, a lot of quenching liquid is lost in excess evaporation and excess absorption into the biochar. The present quenching scheme significantly reduces the amount of quenching liquid needed, facilitates reuse of the quenching liquid, and minimizes the amount of smoke and vapor produced in quenching. Tests by applicant show that quenching by way of quenching reservoir pan 94 and drainage basket 96 uses about half the quenching water of other systems, a feature that is very important and beneficial in remote forest locations.

Attention is now directed to FIGS. 7-12 to describe a biochar module 100 capable of being used with an existing firebox 12 to enable biochar recovery for other uses. Biochar module 100 comprises a module frame 102 configured to support firebox 12 when the module frame 102 is placed under the firebox. Module frame 102 defines a discharge opening 104. Module frame 102 may include a pair of sidewalls 120 connected by an end wall 121. An end of module frame 102 opposite end wall 121 may include a partial end wall 122 for defining discharge opening 104.

Module 100 further comprises a conveyor system 16 supported by module frame 102, wherein the conveyor system 16 is arranged to receive biochar from supported firebox 12 by gravity. Conveyor system is operable to convey the received biochar toward discharge opening 104 of module frame 102 and to discharge the received biochar from a discharge end 52 of the conveyor system at discharge opening 104. Conveyor system 16 of module 100 may be similar to conveyor system 16 of biochar apparatus 10 described above, and may include a conveyor drive motor 54, a drive pulley 56 driven to rotate by conveyor drive motor 54 by way of a gearbox 62, an idler pulley 58 spaced from drive pulley 56, and a conveyor belt 60 engaged by drive pulley 56 and idler pulley 58.

Module 100 may additionally comprise a table 14 over conveyor system 16 arranged to support biomass contained in the supported firebox 12, wherein the table includes a plurality of openings 38 through which pieces of biochar pass to conveyor system 16. Table 14 of module 100 may be similar to table 14 of apparatus 10 described above.

Figure 8:
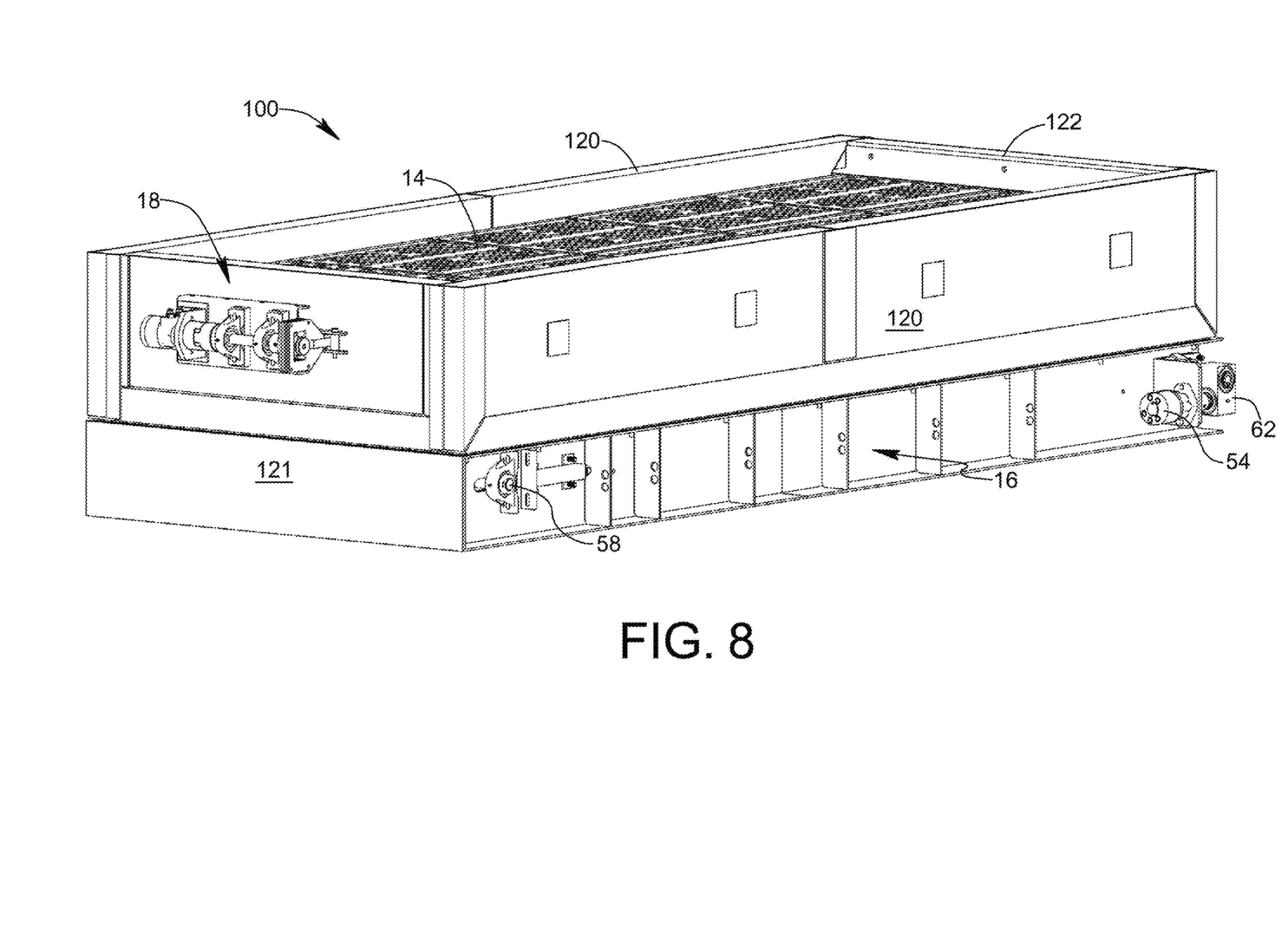
FIG. 8 is another perspective view of the biochar module shown in FIG. 7.
Figure 11:
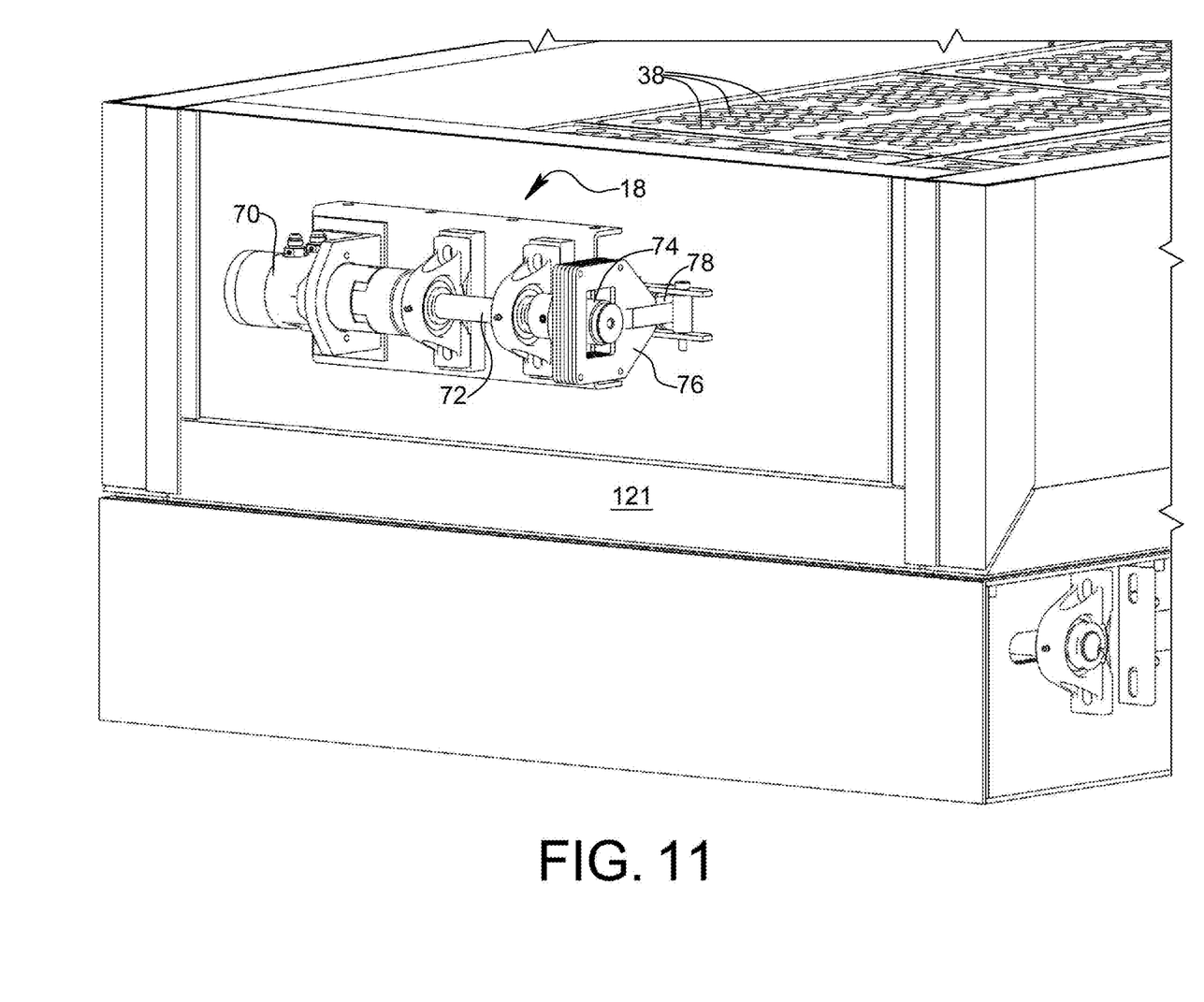
FIG. 11 is a detailed perspective view showing a table shaker mechanism of the biochar module.

Module 100 may be equipped with a shaker mechanism 18 connected to table 14, wherein the shaker mechanism is operable to cyclically move table 14 in a horizontal plane relative to module frame 102. As shown in FIGS. 8 and 11, shaker mechanism 18 of module 100 may be similar to shaker mechanism 18 of apparatus 10, except it is rotated by ninety degrees for secure mounting to end wall 121. The rotational axis of shaker drive shaft 72 remains orthogonal to the shaking stroke axis.

Figure 12:
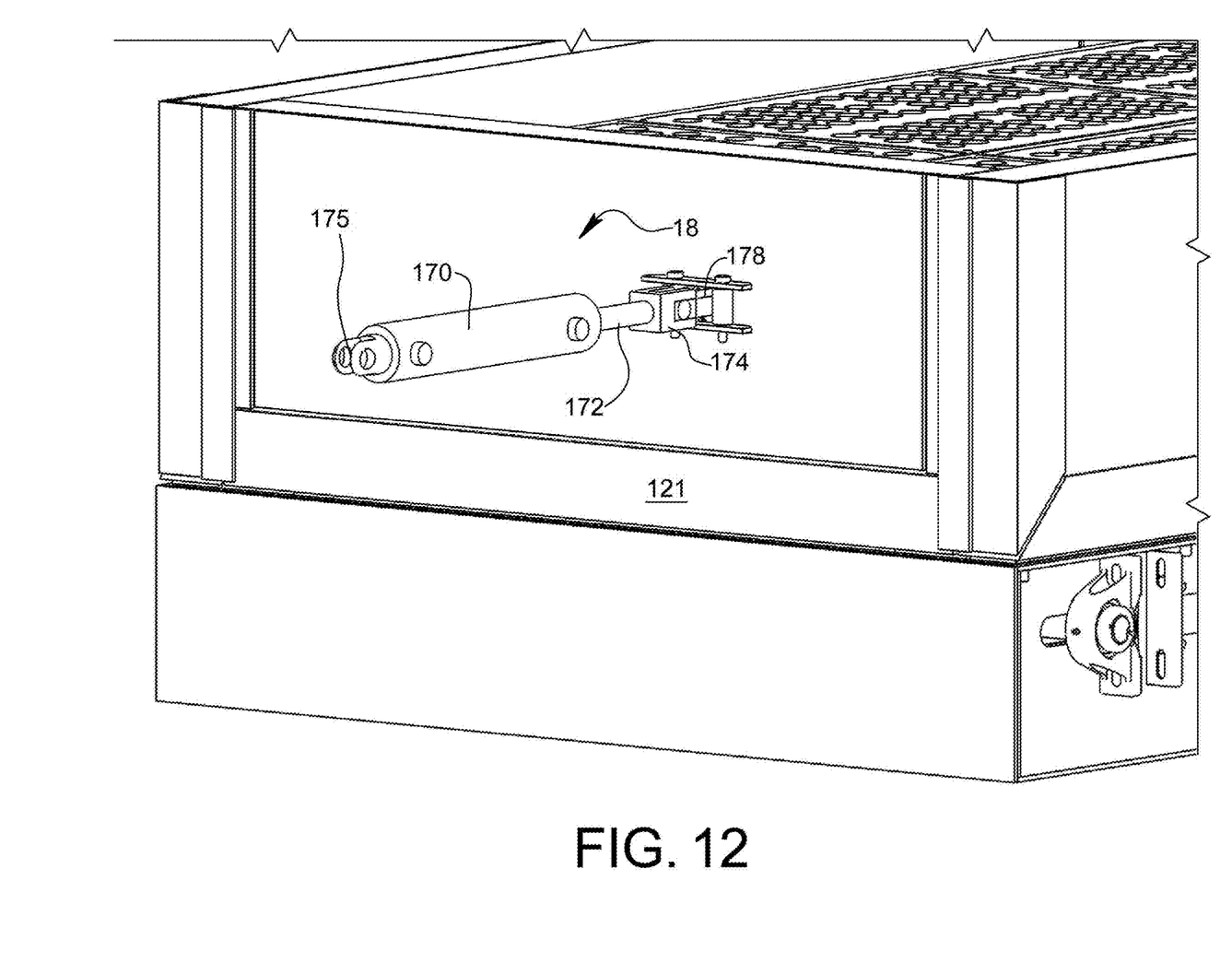
FIG. 12 is a view similar to that of FIG. 11, however showing an alternative table shaker mechanism for the biochar module.

FIG. 12 shows an alternative shaker mechanism 18 in the form of a linear actuator having a cylinder 170, a reciprocating piston 172, and a coupling 174 between a free end of piston 172 and transmission member 178 connected to frame 40 of table 14. Cylinder 170 includes a clevis 175 for mounting the cylinder to support structure (not shown) fixed to module frame 102. As may be understood, piston 172 may be driven back and forth to impart horizontal shaking motion to table 14. The linear actuator may be a hydraulic linear actuator or an electromechanical linear actuator. It is noted that this alternative shaker mechanism 18 in the form of a linear actuator may be used in connection not only with biochar module 100, but also in connection with the previously described biochar apparatus 10.

Figure 9:
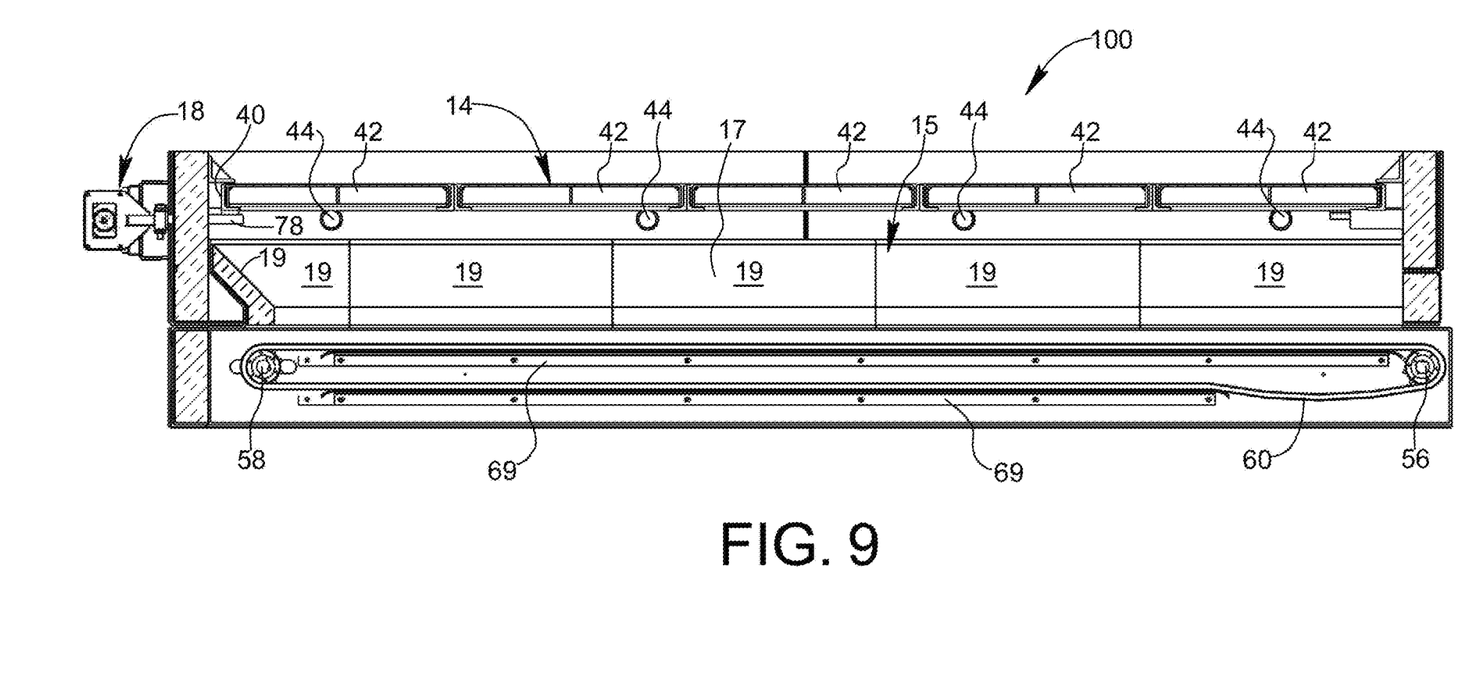
FIG. 9 is a cross-sectional view of the biochar module shown in FIG. 8.
Figure 10:
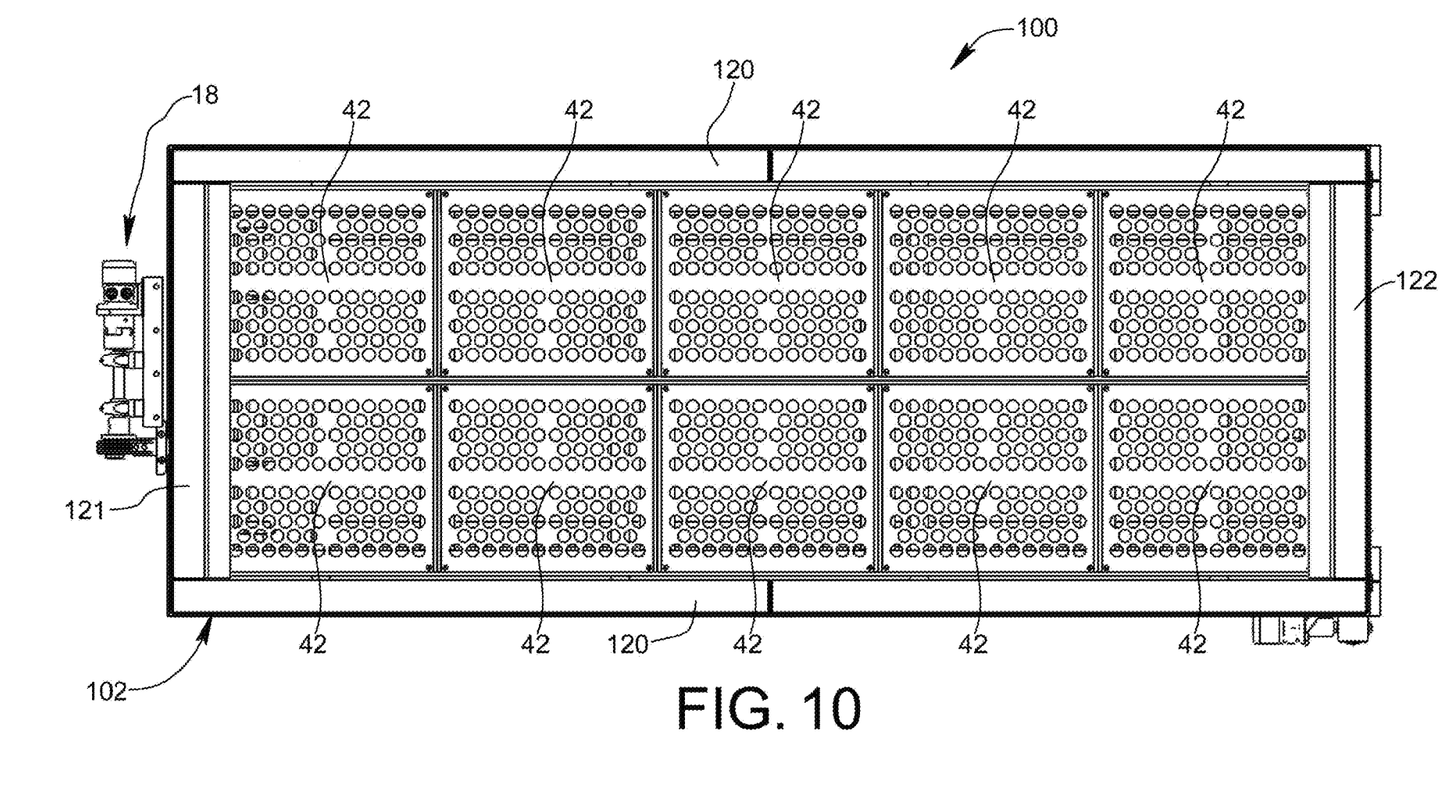
FIG. 10 is a top plan view of the biochar module shown in FIG. 8.

Like biochar apparatus 10, biochar module 100 may comprise a channel 15 between table 14 and conveyor system 16, as shown in FIG. 9. Channel 15 may include a tapered inner wall 17 arranged to cover at least one of the drive pulley 56 and the idler pulley 58 and guide pieces of biochar which fall through peripheral openings 38 of table 14 toward the conveyor belt 60.

Figure 13:
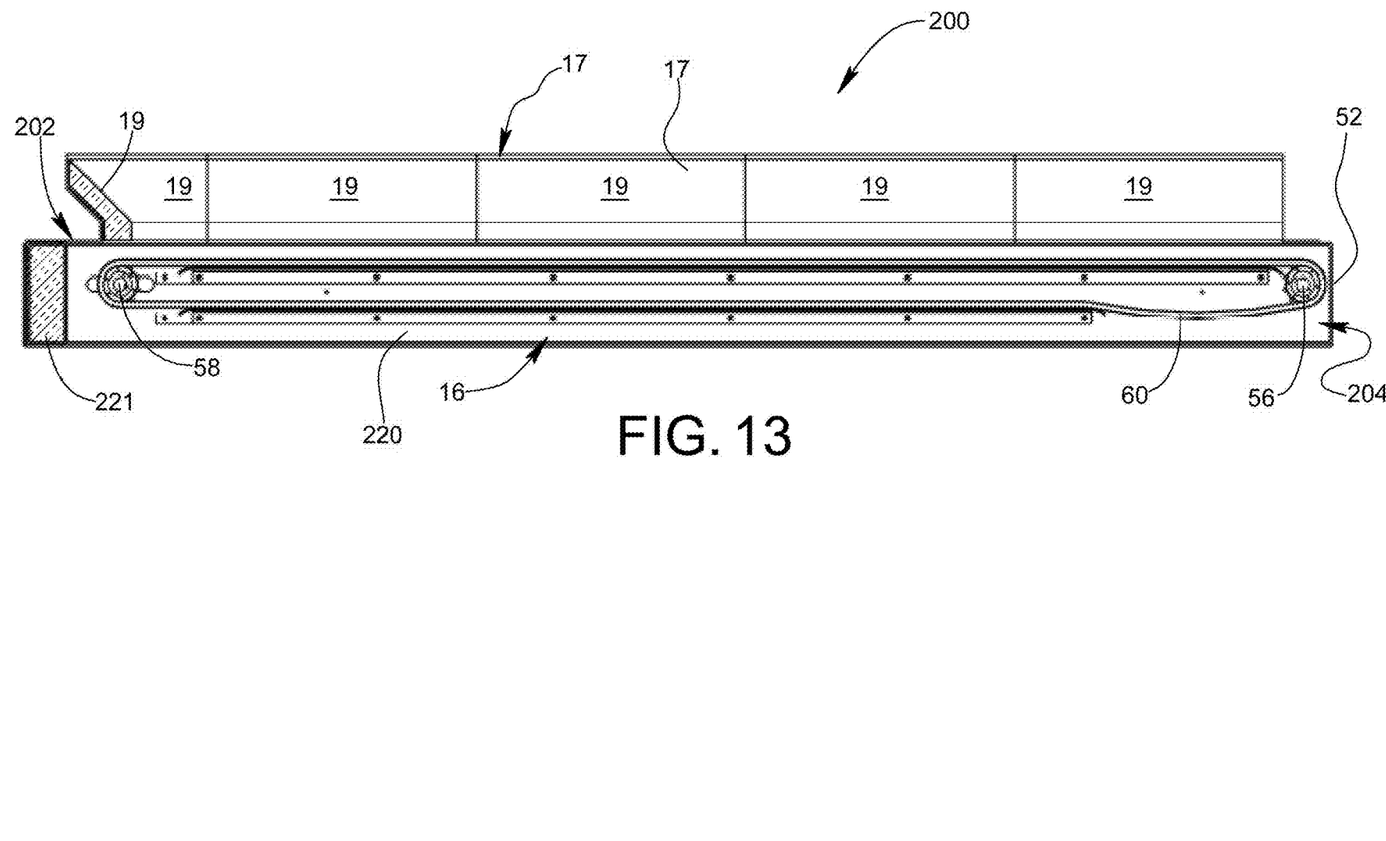
FIG. 13 is a cross-sectional view showing a more basic version of a biochar module without a table and shaker mechanism.

FIG. 13 shows a biochar module 200 of the present disclosure that is more basic than module 100 described above. Module 200 omits table 14 and shaker mechanism 18, and may have a frame 202 that is lower in profile than module frame 102 of module 100. Module frame 202 may have two sidewalls 220 connected by an end wall 221, whereby a discharge opening 204 is defined by an open end of frame 202. In module 200, channel 15 fixed to the module frame 202 extends upwardly from the module frame, through an open bottom of firebox 12, and into a lower region of firebox 12 when the firebox is placed on module frame 202.

While the present disclosure describes exemplary embodiments, the detailed description is not intended to limit the scope of the appended claims to the particular embodiments set forth. The claims are intended to cover such alternatives, modifications and equivalents of the described embodiments as may be included within the scope of the claims.

What is claimed is:

1. An apparatus comprising:
a firebox for containing biomass to be burned to produce biochar;
a table arranged to support biomass contained in the firebox;
a conveyor system under the table, wherein the conveyor system comprises a conveyor drive motor, a drive pulley driven to rotate by the conveyor drive motor, an idler pulley spaced from the drive pulley, and a conveyor belt engaged by the drive pulley and the idler pulley;
a shaker mechanism connected to the table, wherein the shaker mechanism is operable to cyclically move the table in a horizontal plane relative to the firebox; and
a channel between the table and the conveyor system;
wherein the table includes a plurality of openings through which pieces of biochar pass to the conveyor system;
wherein the conveyor system is operable to convey the pieces of biochar and discharge the pieces of biochar from the conveyor system;
wherein the channel includes a tapered inner wall arranged to cover at least one of the drive pulley and the idler pulley and guide the pieces of biochar toward the conveyor belt.

2. The apparatus according to claim 1, wherein the tapered inner wall of the channel includes a thermo-ceramic material.

3. The apparatus according to claim 1, wherein the drive pulley is arranged at a discharge end of the conveyor system.

4. The apparatus according to claim 1, wherein the table includes a table frame and a plurality of grate panels removably supportable by the table frame, wherein the plurality of grate panels includes the plurality of openings.

5. The apparatus according to claim 4, wherein the plurality of grate panels includes grate panels having openings of a first size and grate panels having openings of a second size different from the first size, whereby a size of the pieces of biochar is controllable by choosing grate panels having openings of a desired size.

6. The apparatus according to claim 4, wherein the table frame rests on a plurality of table support members that are fixed relative to the firebox.

7. The apparatus of claim 4, wherein the shaker mechanism transmits a reciprocating horizontal stroke to the table frame in a longitudinal direction of the firebox.

8. The apparatus according to 7, wherein the reciprocating horizontal stroke is in a range from one inch through two inches.

9. The apparatus according to claim 7, wherein the shaker mechanism includes a shaker drive motor, a shaker drive shaft rotated by the shaker drive motor, a cam coupled to the shaker drive shaft, a follower engaged by the cam, and a transmission member arranged to transmit motion from the follower to the table frame, wherein the cam is eccentrically arranged with respect to a rotational axis of the shaker drive shaft.

10. The apparatus according to claim 7, wherein the shaker mechanism includes a linear actuator connected to the table frame.

11. The apparatus according to claim 1, further comprising a quenching reservoir pan adjacent a discharge end of the conveyor system, and a drainage basket removably received by the quenching reservoir pan, wherein the pieces of biochar are discharged from the conveyor system to the drainage basket and the quenching reservoir pan.

12. The apparatus according to claim 11, wherein the drainage basket includes a pair of handles arranged on opposite sides of the drainage basket.

13. The apparatus according to claim 11, wherein the quenching reservoir pan has a width corresponding to a width of the conveyor belt, and the drainage basket has a width dimensioned for close fit within the width of the quenching reservoir pan.

14. The apparatus according to claim 11, wherein the quenching reservoir pan has a length greater than a length of the drainage basket.

15. The apparatus according to claim 1, further comprising a chassis having a front end and a rear end, wherein the firebox is carried by the chassis, and the conveyor system is operable to convey the pieces of biochar to the rear end of the chassis and discharge the pieces of biochar from the conveyor system at the rear end of the chassis.

16. The apparatus according to claim 15, wherein the rear end of the chassis includes a transverse gap for allowing the pieces of biochar to be discharged from the conveyor system.

* * * * *